US010984250B2

(12) United States Patent
Wu et al.

(10) Patent No.: US 10,984,250 B2
(45) Date of Patent: Apr. 20, 2021

(54) METHOD AND SYSTEM FOR MANAGEMENT OF ARTICLE STORAGE AND COMPUTER-READABLE MEDIUM

(71) Applicant: BOE TECHNOLOGY GROUP CO., LTD., Beijing (CN)

(72) Inventors: Naifu Wu, Beijing (CN); Xitong Ma, Beijing (CN); Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 157 days.

(21) Appl. No.: 16/262,471

(22) Filed: Jan. 30, 2019

(65) Prior Publication Data

US 2019/0370561 A1 Dec. 5, 2019

(30) Foreign Application Priority Data

May 31, 2018 (CN) .......................... 201810552813.X

(51) Int. Cl.
*G06K 9/00* (2006.01)
*G06Q 30/02* (2012.01)
*G06Q 30/06* (2012.01)

(52) U.S. Cl.
CPC ..... *G06K 9/00771* (2013.01); *G06K 9/00288* (2013.01); *G06K 9/00718* (2013.01); *G06Q 30/0207* (2013.01); *G06Q 30/0601* (2013.01)

(58) Field of Classification Search
CPC .......... G06K 9/00288; G06K 9/00295; G06K 9/00335; G06K 9/00711; G06K 9/00718;
(Continued)

(56) References Cited

U.S. PATENT DOCUMENTS

| 2015/0039458 | A1* | 2/2015 | Reid | G06K 9/00771 |
| | | | | 705/26.1 |
| 2016/0203499 | A1* | 7/2016 | Yamashita et al. | |
| | | | | G06Q 30/0201 |
| | | | | 705/7.29 |

(Continued)

FOREIGN PATENT DOCUMENTS

| CN | 105518734 A | 4/2016 |
| CN | 107025690 A | 8/2017 |

(Continued)

OTHER PUBLICATIONS

Chinese Office Action dated Apr. 8, 2020, from application No. 201810552813.X.

*Primary Examiner* — Andrew W Johns
(74) *Attorney, Agent, or Firm* — Thomas Horstemeyer, LLP

(57) ABSTRACT

The present disclosure provides a method for managing an article storage. The method includes recognizing user identity information, and associating the user identity information with a user identifier. The method includes obtaining first information on taking an article by a user, which includes an article identifier of the article, the user identifier of the user, an identifier of a location where the article is taken, and information on an action of taking the article by the user. The method includes obtaining second information on placing the article by the user, which includes the article identifier of the article, the user identifier of the user, an identifier of a location where the article is placed, and information on an action of placing the article by the user. The method includes classifying the action of placing the article by the user based on the first information and the second information.

11 Claims, 6 Drawing Sheets

(58) Field of Classification Search
CPC ........... G06K 9/00771; G06Q 30/0207; G06Q 30/0601; G06Q 30/0639
See application file for complete search history.

(56) References Cited

U.S. PATENT DOCUMENTS

| | | | |
|---|---|---|---|
| 2016/0210829 A1* | 7/2016 | Uchida et al. ... | G08B 13/19645 |
| 2017/0228811 A1* | 8/2017 | Moreau et al. .... | G06Q 30/0633 |
| 2017/0286986 A1 | 10/2017 | Dey et al. .......... | G06Q 30/0224 |
| 2020/0019921 A1* | 1/2020 | Buibas et al. ..... | G06K 9/00362 |
| 2020/0110944 A1* | 4/2020 | Kakino .................... | G07G 1/14 |

FOREIGN PATENT DOCUMENTS

| | | |
|---|---|---|
| CN | 107644332 A | 1/2018 |
| CN | 107862360 A | 3/2018 |

\* cited by examiner

METHOD AND SYSTEM FOR MANAGEMENT OF ARTICLE STORAGE AND COMPUTER-READABLE MEDIUM

CROSS-REFERENCE

This application is based upon and claims priority to Chinese Patent Application No. 201810552813.X, filed on May 31, 2018, the entire contents thereof are incorporated herein by reference.

TECHNICAL FIELD

This application relates to the field of computer technologies, and more particularly, to a method and a system for management of article storage and a computer-readable medium.

BACKGROUND

With the development of science and technology, in order to save manpower and further liberate manpower, user self-service article storage methods have attracted more and more attention. One such example is unmanned supermarket. However, there is no staff or few staff in the unmanned supermarket, and thus shelves and commodities cannot be tidied up timely. Therefore, consumers need to more orderly put back commodities taken but not purchased. In addition, even for an ordinary supermarket, it is not expected that the consumers discard the selected commodities anywhere.

For this reason, it is required a method for management of orderly article storage.

The foregoing information disclosed in Background is merely to strengthen the understanding of the background of the present disclosure. Therefore, the foregoing information may include information not constituting the prior art known to those of ordinary skill in the art.

SUMMARY

This application discloses a method and a system for management of article storage and a computer-readable medium.

Other features and improvements of the present disclosure will become apparent from the following detailed description, or will be obtained in part, by practice of the present disclosure.

According to an aspect of the present disclosure, there is provided a method for management of article storage. The method includes recognizing user identity information, and associating the user identity information with a user identifier. The method includes obtaining first information on taking an article by a user. The first information includes an article identifier of the article, the user identifier of the user, an identifier of a location where the article is taken, and information on an action of taking the article by the user. The method includes obtaining second information on placing the article by the user. The second information includes the article identifier of the article, the user identifier of the user, an identifier of a location where the article is placed, and information on an action of placing the article by the user. The method includes classifying the action of placing the article by the user based on the first information and the second information.

According to some arrangements, classifying the action of placing the article by the user based on the first information and the second information includes generating information on a correct storage area of the article based on the article identifier of the article and the identifier of the location where the article is taken of the first information. The correct storage area includes the location where the article is taken. Such an operation further includes determining the location where the article is placed based on the identifier of the location where the article is placed of the second information, and classifying the action of placing the article by the user as a first type of action when the location where the article is placed is not in the correct storage area.

According to some arrangements, the article is a commodity, and the user is a consumer.

According to some arrangements, the correct storage area of the article includes at least one of a shopping cart of the consumer, a shelf from which the commodity being taken, a shelf to which the commodity being assigned, or a temporary storage area. The shopping cart includes a shopping cart identifier, and the shelf includes a shelf identifier.

According to some arrangements, the method further includes establishing a matching relationship between the commodity and the consumer after obtaining the first information on taking the commodity by the consumer. The method further includes canceling the matching relationship between the commodity and the consumer if the placement area is not the shopping cart of the consumer after the second information on placing the commodity by the consumer is obtained.

According to some arrangements, the action of the consumer is determined as the first type of action if quantity of commodities matching the consumer is not equal to that of commodities settled by the consumer after settlement information of the consumer is obtained.

According to some arrangements, the method further includes giving a negative incentive to the first type of action of the user.

According to some arrangements, giving a negative incentive to the first type of action of the user includes deducting marks of the user or reducing shopping discounts in a database.

According to some arrangements, obtaining first information on taking an article by the user includes obtaining first image information on taking the article by the user based on an image capturing apparatus. Such an operation to obtain the first information includes recognizing, in the first image information, the article identifier of the article, the identifier of the location where the article is taken, feature information of the user, and the information on the action of taking the article by the user. Obtaining second information on placing the article by the user includes obtaining second image information on placing the article by the user based on the image capturing apparatus. Such an operation to obtain the second information includes recognizing, in the second image information, the article identifier of the article, the identifier of the location where the article is placed, the feature information of the user, and the information on the action of placing the article by the user; and determining the user identifier of the user based on the feature information of the user.

According to some arrangements, the method further includes establishing a correlation between the consumer and the shopping cart.

According to another aspect of the present disclosure, there is provided a system for management of article storage. The system includes a user recognition module configured to recognize user identity information and associate the user identity information with a user identifier. The system includes a first information obtaining module configured to obtain first information on taking an article by a user. The first information includes an article identifier of the article, the user identifier of the user, an identifier of a location where the article is taken, and information on an action of taking the article by the user. The system includes a second information obtaining module configured to obtain second information on placing the article by the user. The second information includes the article identifier of the article, the user identifier of the user, an identifier of a location where the article is placed, and information on an action of placing the article by the user. The system includes a classifying module configured to classify the action of placing the article by the user based on the first information and the second information.

According to some arrangements, the classifying module includes an area information submodule configured to generate information on a correct storage area of the article based on the article identifier of the article and the identifier of the location where the article is taken of the first information. The correct storage area includes the location where the article is taken. The classifying module includes a location information submodule configured to determine the location where the article is placed based on the identifier of the location where the article is placed of the second information. The classifying module includes and a first classifying submodule configured to classify the action of placing the article by the user as a first type of action when the location where the article is placed is not in the correct storage area.

According to another aspect of the present disclosure, there is provided a system for management of article storage. The system includes a processor and a memory storing a computer program thereon. When the computer program is executed by the processor, any one of the foregoing methods is implemented.

According to still another aspect of the present disclosure, there is provided a computer-readable medium storing a computer program. When the program is executed by a processor, any one of the foregoing methods is implemented.

BRIEF DESCRIPTION OF THE DRAWINGS

The above and other features and improvements of the present disclosure will become more apparent from the following detailed description of exemplary arrangements with reference to the drawings, in which.

DETAILED DESCRIPTION

Figure 1:
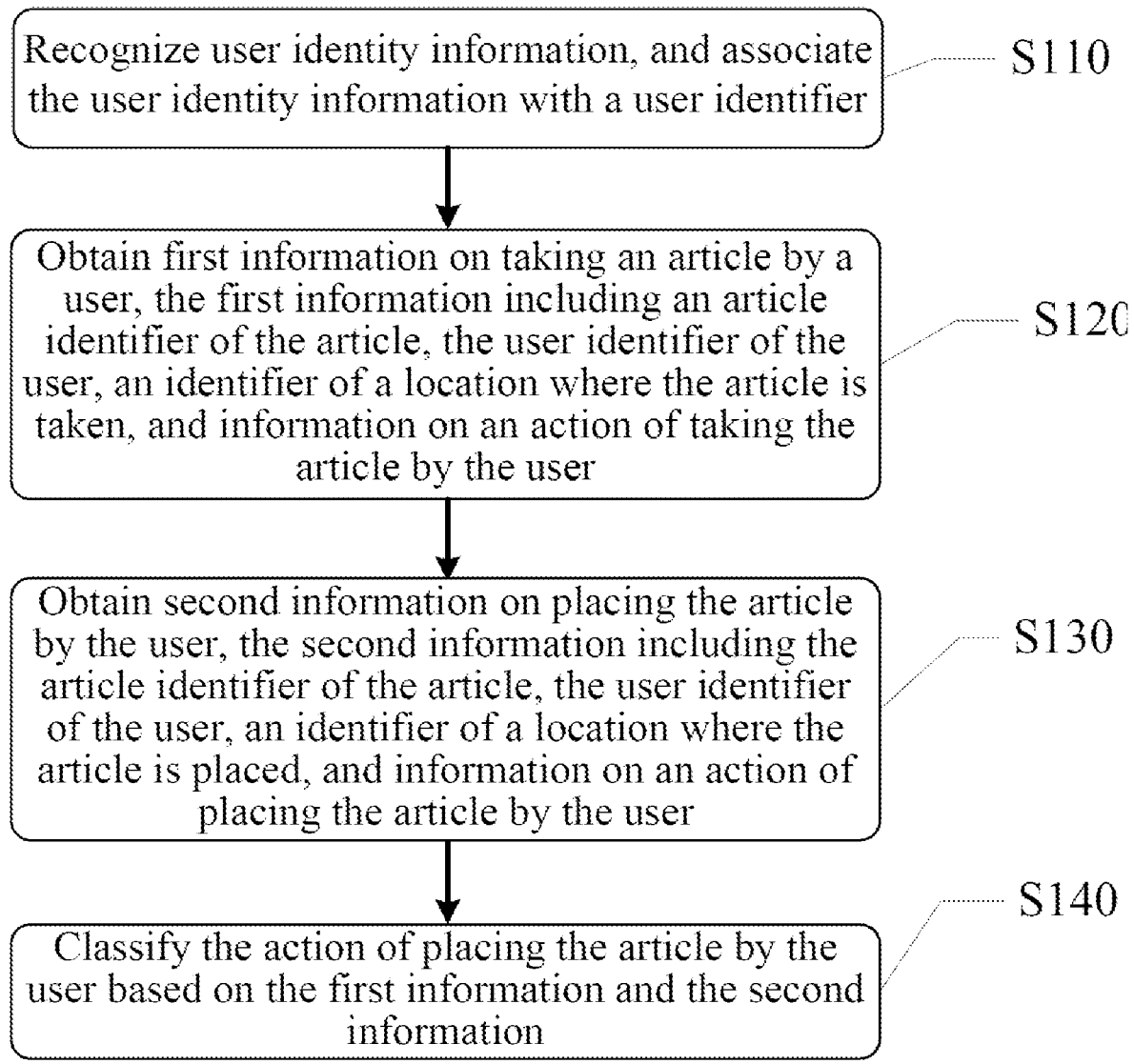
FIG. 1 illustrates a method for management of article storage according to some arrangements of the present disclosure.

The exemplary arrangements will now be described more fully with reference to the accompanying drawings. However, the exemplary arrangements can be implemented in a variety of forms and should not be construed as being limited to the arrangements set forth herein. Rather, these arrangements are provided so that the present disclosure will be thorough and complete and will fully convey the concepts of the exemplary arrangements to those skilled in the art. The same reference numerals in the drawings denote the same or similar parts, and thus repeated description thereof will be omitted.

In addition, the features, structures, or characteristics described may be combined in one or more arrangements in any suitable manner. Many concrete details are provided in the following descriptions for a full understanding of arrangements of the present disclosure. However, those skilled in the art will appreciate that one or more of the specific details may be practiced without practicing the technical solutions of the present disclosure, and other methods, components, materials, devices, steps, and the like may be employed. In other instances, well-known structures, methods, devices, implementations, materials, or operations are not shown or described in detail to avoid obscuring aspects of the present disclosure.

The block diagrams illustrated in the drawings do not necessarily correspond to any physically separate entity. In other words, these functional entities may be implemented in software form, or implemented in one or more hardware modules or integrated circuits, or implemented in different networks and/or processor devices and/or microcontroller devices.

The flowcharts as shown in the accompanying drawings are merely exemplary description instead of necessarily including all the blocks. For example, some blocks may be divided, while some blocks may be combined or partly combined. Therefore, the actual execution sequences may be changed according to the actual conditions.

Management of article storage is applied in many scenes. Taking an unmanned supermarket as an example, in the unmanned supermarket shopping scenario, consumers may not normatively place commodities selected but not to be purchased. For example, the consumers may discard the commodities on other shelves, which causes difficulty in supermarket management and results in a disorderly shopping environment, and thus it is undesirable to fast and efficient shopping for the consumers. In this application, a supermarket is a broad-sense concept, not only including an unmanned supermarket, but also including an ordinary supermarket or any other environments or places where consumers may implement self-help shopping. In addition, in this application, a shelf is also used in a broad sense, which may be any structure or apparatus for placing or containing commodities, for example, an ordinary shelf, a container or a freezer, etc.

According to a technical idea of this application, when management of article storage is performed, an action of placing an article by a user is classified based on obtained information. Corresponding incentive is given for the user's action to cultivate a good habit of article storage for the user.

The technical solutions of this application are described in detail below with reference to the accompanying drawings. In the following description, in a scene where the user is shopping, the user is also referred to as a consumer, and an article is also referred to as a commodity.

FIG. 1 illustrates a method for management of article storage according to some arrangements of the present disclosure. This method may be implemented by means of, for example, a video monitoring system.

As shown in FIG. 1, in block S110, user identity information is recognized, and the user identity information is associated with a user identifier. This may be implemented by means of face recognition and so on.

Taking an application scene of the unmanned supermarket as an example, according to some arrangements, when the consumer (user) enters the supermarket, a supermarket video monitoring system can recognize the consumer by means of face recognition. The consumer may register as a member in advance, such that the supermarket video monitoring system can recognize the consumer. If the consumer is not a member, a consumer management system may quickly generate an identifier for the consumer, such that the consumer may become a member after a simple confirmation or even without confirmation. It is easy to recognize the consumer by means of face recognition using the video monitoring system, which is not unnecessarily described herein. Of course, this application is not limited to recognizing the consumer by means of face recognition, the consumer may be recognized by other means.

According to some exemplary arrangements, after the consumer is subject to face recognition and enter the supermarket, the consumer may obtain a shopping cart automatically allocated by the supermarket. The shopping cart includes a corresponding identifier, such that an association is established between the consumer and the shopping cart.

According to some exemplary arrangements, when the consumer obtains the shopping cart, the video monitoring system on the shopping cart performs face recognition for the consumer and establishes the association between the consumer and the shopping cart.

According to some exemplary arrangements, the consumer and the shopping cart may be recognized by means of monitoring videos of the supermarket, and an association may be established between the consumer and the shopping cart.

In block S120, first information on taking an article by a user is obtained, the first information including an article identifier of the article, the user identifier of the user, an identifier of a location where the article is taken, and information on an action of taking the article by the user. This may be implemented by means of the video monitoring system.

According to some arrangements, first image information on taking the article by the user may be obtained based on an image capturing apparatus, and the user identity information is recognized, in the first image information, the article identifier of the article, the identifier of the location where the article is taken, feature information of the user, and the information on the action of taking the article by the user.

Taking an application scene of the unmanned supermarket as an example, according to some exemplary arrangements, a plurality of image capturing apparatuses may be arranged on the shelves and/or other locations in the supermarket. When the consumer takes a commodity (an article) from a shelf, the video monitoring system may recognize an article identifier of the article, an identifier of a location where the article is taken, feature information of the user, and information on an action of taking the article by the user by means of action recognition, face recognition and image recognition of an identifier (for example, a barcode) on the article based on video streams captured by the image capturing apparatuses. The user identifier of the user may be determined based on the user feature information such as face feature information and gait feature information, etc. These video monitoring and recognition methods can be easily implemented, and thus their detailed descriptions are omitted here.

According to some arrangements, a shelf from which the commodity being taken (i.e., information on the location where the article is taken) also may be recognized based on the location of the image capturing apparatus.

According to some arrangements, a matching relationship between the commodity and the consumer is established after obtaining the first information on taking the commodity by the consumer. The first information includes an article identifier of the commodity, the user identifier of the consumer, an identifier of the location where the commodity is taken, and information on an action of taking the commodity by the user. The matching relationship between the commodity and the consumer may be established based on the article identifier and the user identifier of the first information.

In block S130, second information on placing the article by the user is obtained. The second information includes the article identifier of the article, the user identifier of the user, an identifier of a location where the article is placed, and information on an action of placing the article by the user. This may be implemented by means of the video monitoring system.

According to some arrangements, second image information on placing the article by the user may be obtained based on the image capturing apparatus, and the user identity information is recognized, in the second image information, the article identifier of the article, the identifier of the location where the article is placed, the feature information of the user, and the information on the action of placing the article by the user.

Taking an application scene of the unmanned supermarket as an example, according to some exemplary arrangements, a plurality of image capturing apparatuses may be arranged on the shelves and/or other locations in the supermarket. When the consumer places a commodity (an article) on a shelf or other locations, the video monitoring system may recognize an article identifier of the article, an identifier of a location where the article is placed, feature information of the user, and information on an action of placing the commodity by the user by means of action recognition, face recognition and image recognition of an identifier (for example, a barcode) on the commodity based on video streams captured by the image capturing apparatuses. The user identifier of the user may be determined based on the user feature information such as face feature information and gait feature information, etc. These video monitoring and recognition methods can be easily implemented, and thus their detailed descriptions are omitted here.

According to some arrangements, a shelf from which the commodity being placed (i.e., information on the location where the commodity is placed) also may be recognized based on the location of the image capturing apparatus.

According to some exemplary arrangements, the location where the commodity is placed may be determined based on information on the location of the image capturing apparatus or location information on an area where the image capturing apparatus photographs. For example, if the commodity is recognized based on the monitoring video streams captured by the image capturing apparatus on a shopping cart, the location where the commodity is placed is the shopping cart. If the commodity is recognized based on the monitoring video captured by the image capturing apparatus on a shelf, the location where the commodity is placed is the shelf. In the same way, it may be recognized that the location where the commodity is placed is a temporary storage area or other areas.

According to some arrangements, the matching relationship established between the commodity and the consumer is canceled if a placement area is not the shopping cart of the consumer after the second information on placing the commodity by the consumer is obtained. The second information includes the article identifier of the commodity, the user identifier of the consumer, an identifier of a location where the commodity is placed, and information on an action of placing the commodity by the user. Whether the placement area is the shopping cart of the consumer may be determined based on the identifier of the location where the commodity is placed. If the placement area is not the shopping cart of the consumer, the established matching relationship between the commodity and the consumer may be canceled based on the article identifier and the user identifier. This represents that the consumer is not associated with the commodity, and thus recurrence of an event of randomly placing the commodity is not related to the consumer. In addition, in such a case, if the consumer does not place commodities at a location outside a monitoring range or intentionally avoid monitoring, quantity of matching relationship between the consumer and the commodities should be equal to that of the commodities in the shopping cart.

In block S140, the action of placing the article by the user is classified based on the first information and the second information.

According to some exemplary arrangements, information on a correct storage area of the article is generated based on the article identifier of the article and the identifier of the location where the article is taken of the first information. The correct storage area includes the location where the article is taken. The location where the article is placed is determined based on the identifier of the location where the article is placed of the second information. The action of placing the article by the user is classified as a first type of action when the location where the article is placed is not in the correct storage area.

Taking the unmanned supermarket as an example, the correct storage area may include at least one of a shopping cart of the consumer, a location (shelf) from which the commodity being taken, a shelf to which the commodity being assigned, or a temporary storage area. The shopping cart includes a shopping cart identifier, and the shelf includes a shelf identifier. Generally, after the consumer takes a commodity, the consumer may place the commodity into the shopping cart. If the consumer has taken a commodity but changes the purchase intention, the consumer may likely put the commodity back to the location where the commodity was taken (a shelf from which the consumer takes the commodity) or a shelf to which the commodity being assigned (the shelf on which the commodity should be placed), or may place the commodity in a temporary storage area (which is used for temporarily storing commodities taken by the consumer but not purchased finally) planned for the supermarket, which is desired for the supermarket. Since the commodity may be taken by other consumers and then placed at random, the shelf from which the commodity being taken may differ from the shelf to which the commodity being assigned.

However, an undesired situation is as below: the consumer randomly places the selected commodity on other shelves (different from the shelf from which the commodity being taken or the shelf to which the commodity being assigned), or places the selected commodity in other areas (areas other than the shelf from which the commodity being taken, the shelf to which the commodity being assigned, other shelves and the temporary storage area, for example, the commodity is placed on the floor in extreme cases).

In addition, similar problems exist for a commodity that has been placed into the shopping cart by the consumer. If the consumer decides to purchase a commodity, the commodity will not be taken out of the shopping cart. If the consumer changes the purchase intention, the commodity may likely be taken out of the shopping cart. Next, the consumer likely may place the commodity on the shelf from which the commodity being taken, the shelf to which the commodity being assigned, other shelves, the temporary storage area, or other areas.

According to some exemplary arrangements, in order to enable the consumer to know which is the shelf to which the commodity that is taken but not desired to be purchased should be put back, identification information or encoding information identifying the shelf location or the location of the temporary storage area may be labeled on the commodity. The encoding information may be, for example, any one of two-dimensional code information, barcode information, or radio frequency identification encoding information. The supermarket may be equipped with a code scanning terminal, such that the consumer may obtain shelf location information and/or information on the temporary storage area by scanning on the scanning terminal.

According to some exemplary arrangements, an operation may be performed on a purchase record based on an action that the consumer places a commodity into the shopping cart or takes the commodity out of the shopping cart. For example, if it is recognized that the consumer places a commodity into the shopping cart based on monitoring video captured by the image capturing apparatus on the shopping cart, the purchase record of the commodity may be increased. Otherwise, the purchase record of the commodity may be deleted if it is recognized that the consumer takes the commodity out of the shopping cart. In this way, accounts may be settled based on the purchase record when the consumer leaves the supermarket.

When the location where the article is placed is not the correct storage area, for example, when the location where the commodity is placed is none of the shopping cart of the consumer, the shelf (location where the commodity is taken) from which the commodity being taken, the shelf to which the commodity being assigned or the temporary storage area, the action of placing the article by the user is classified as the first type of action, which is an action that should be given a negative incentive and needs to be eradicated as much as possible.

As previously mentioned, if the placement area is determined as not the shopping cart of the consumer based on the identifier of a location where the commodity is placed, the established matching relationship between the commodity and the consumer may be canceled. In such a case, if the consumer does not place commodities at a location outside a monitoring range or intentionally avoid monitoring, quantity of matching relationship between the consumer and the commodities should be equal to that of the commodities in the shopping cart. Hereby, according to some arrangements, the action of the consumer is determined as the first type of action if quantity of commodities matching the consumer is not equal to that of commodities settled by the consumer after settlement information of the consumer is obtained.

According to some exemplary arrangements, when the action of the consumer is determined as the first type of action, the number of times of the first type of action of the consumer may be added in the consumer management system, for example, the number of accumulations is plus one to serve as a basis for giving a negative incentive to the consumer in future.

For example, marks of the consumer are deducted in a database, or shopping discounts of the consumer are reduced or canceled. Through database records and incentives based on mark operations, cultivation of habits may be ensured more continuous.

In this way, according to some arrangements of the present disclosure, in the process of management of article storage, an action of placing the article by the user may be classified based on information on taking/placing the article, and a corresponding incentive may be given based on action classification. In this way, a good habit of storing articles may be cultivated for the user, and an orderly environment in an application scene such as a supermarkets is created.

Figure 2:
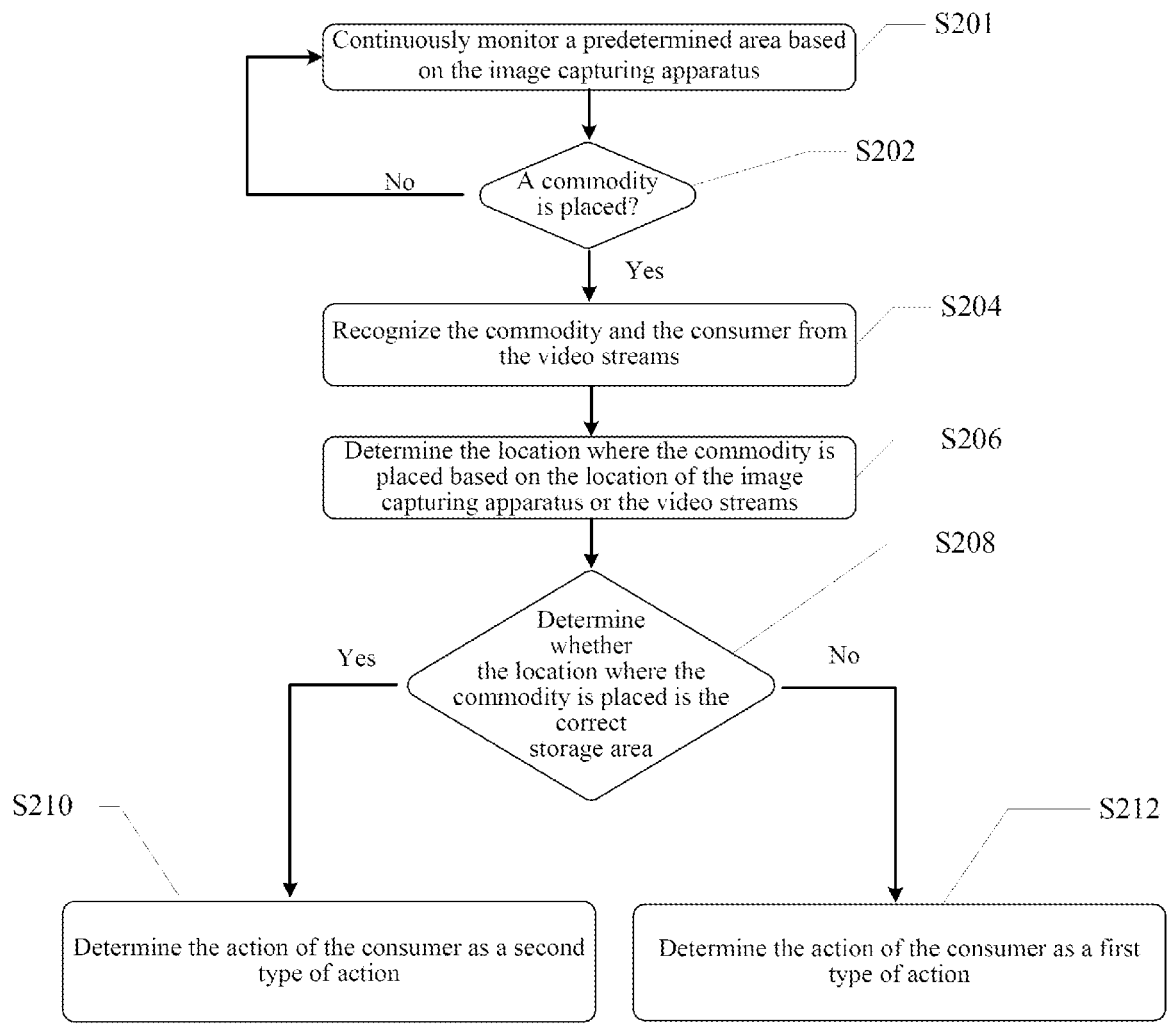
FIG. 2 illustrates a method for determining where a commodity is according to some exemplary arrangements of the present disclosure.

FIG. 2 illustrates a method for determining where a commodity is according to some exemplary arrangements of the present disclosure.

In the exemplary method as shown in FIG. 2, the supermarket video monitoring system determines whether the location where the commodity is placed is the correct storage area by recognizing events of taking or putting back the commodity by the consumer. The method is described below with reference to FIG. 2.

In block S201, a predetermined area is continuously monitored based on the image capturing apparatus. The video monitoring system captures video streams obtained by the plurality of image capturing apparatuses, and continuously monitors a plurality of predetermined areas corresponding to the plurality of image capturing apparatuses.

In block S202, an event of placing the commodity is recognized from the video streams.

In block S204, the commodity and the consumer are recognized from the video streams. It is unnecessary to recognize the consumer if the commodity includes a unique individual code. The consumer placing the commodity may be determined based on the recorded matching relationship between the commodity and the consumer. When the commodity only includes a category code but includes no unique individual code, it is necessary to recognize the consumer placing the commodity to determine the consumer placing the commodity.

In block S206, the location where the commodity is placed is determined based on the location of the image capturing apparatus or the video streams.

In block S208, whether the location where the commodity is placed is the correct storage area it is determined. If the determination result is yes, the process proceeds to block S210; otherwise, the process proceeds to block S212.

In block S210, the action of the consumer is determined as a second type of action, for example, an action to which a positive incentive may be given.

In block S212, the action of the consumer is determined as the first type of action, for example, an action to which a negative incentive needs to be given.

Figure 3:
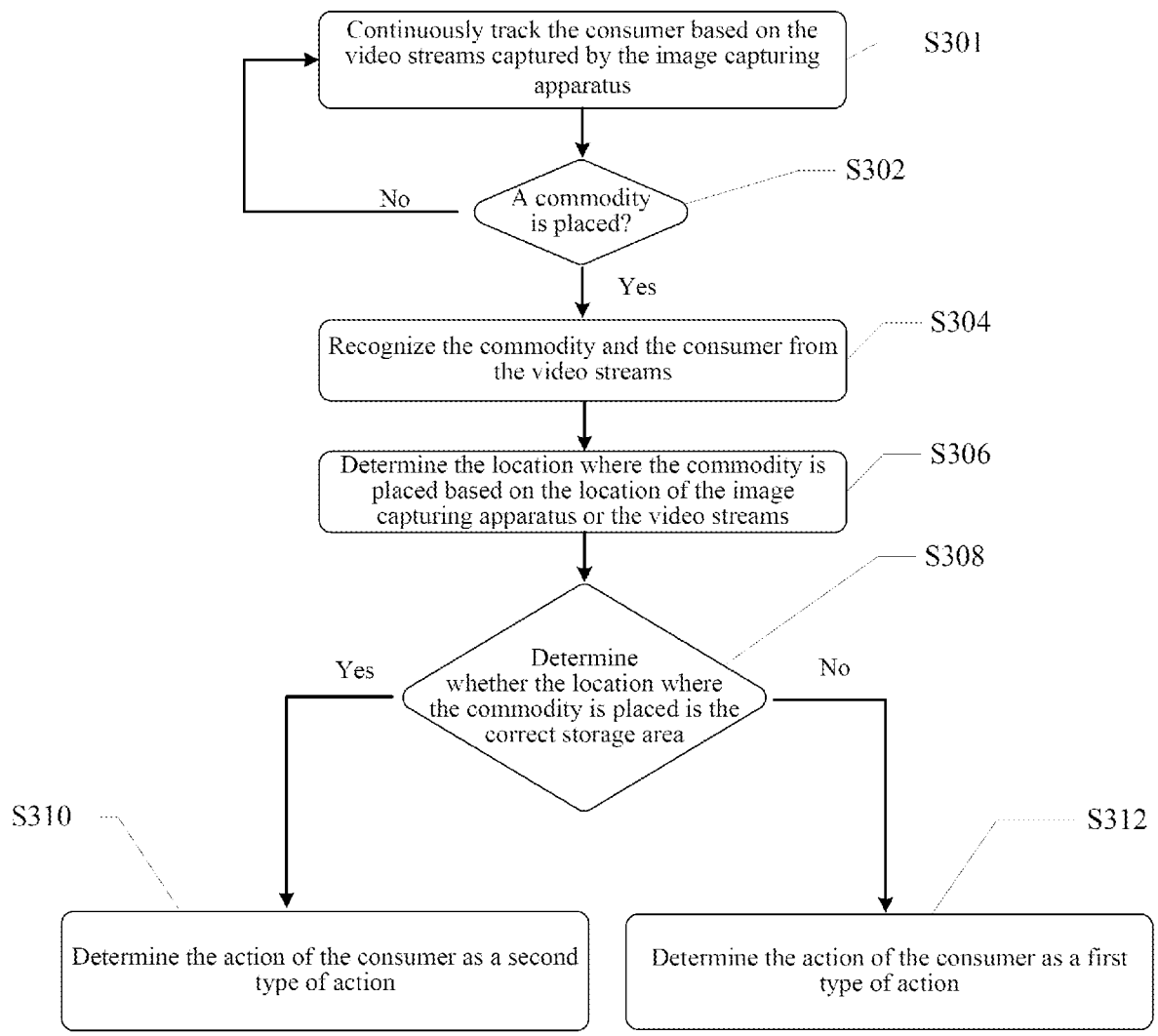
FIG. 3 illustrates a method for determining where a commodity is according to some exemplary arrangements of the present disclosure.

FIG. 3 illustrates a method for determining where a commodity is according to some exemplary arrangements of the present disclosure.

The method as shown in FIG. 3 is substantially similar as the method as shown in FIG. 2 except that in the method as shown in FIG. 3, referring to block S301, whether an event of placing the commodity has occurred is determined by continuously tracking the consumer based on the video streams captured by the image capturing apparatus and by analyzing and recognizing the action of the consumer. The remaining blocks S302, S304, S306, S308, S310, and S312 are similar to those as shown in FIG. 2, and thus their detailed descriptions are omitted here.

Figure 4:
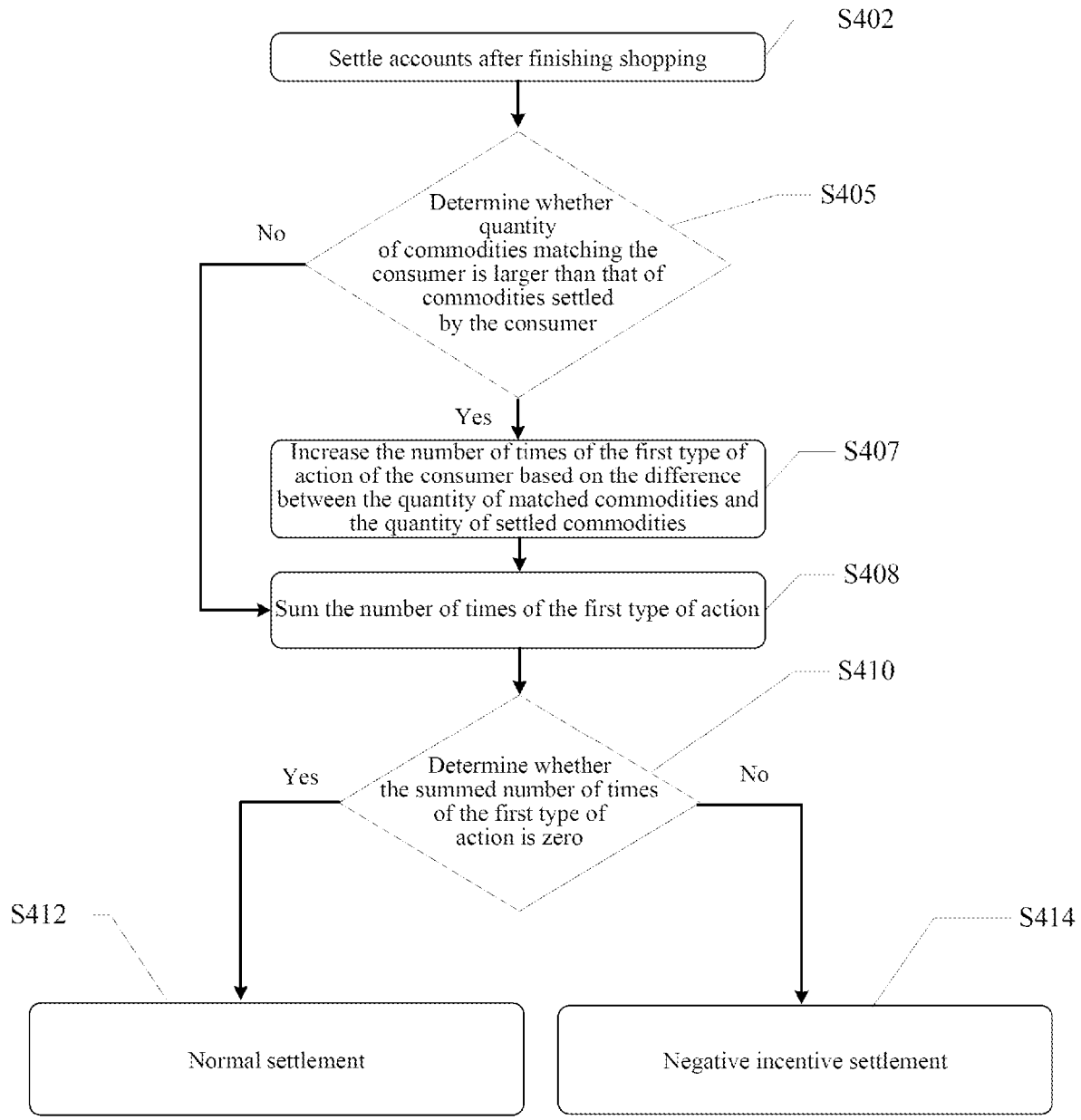
FIG. 4 illustrates a method for consumer settlement according to some exemplary arrangements of the present disclosure.

FIG. 4 illustrates a method for consumer settlement according to some exemplary arrangements of the present disclosure.

Referring to FIG. 4, in block S402, the method is started to settle accounts after the consumer finishes shopping.

In block S405, after the settlement information of the consumer is obtained, the action of the consumer is determined as the first type of action if quantity of commodities matching the consumer is larger than that of commodities settled by the consumer, and the process proceeds to block S407; otherwise, the process proceeds to block S408.

In block S407, the number of times of the first type of action of the consumer is increased based on the difference between the quantity of matched commodities and the quantity of settled commodities.

In block S408, the number of times of the first type of action of the consumer in this shopping is summed.

In block S410, whether the summed number of times of the first type of action is zero is determined. The process proceeds to S412 if the summed number of times of the first type of action is zero; otherwise, the process proceeds to S414.

In block S412, normal settlement is proceeded. For example, settlement is proceeded at a normal discount, etc.

In block S414, a negative incentive settlement is proceeded. For example, marks of the consumer are deducted in a database, or shopping discounts of the consumer are reduced or canceled.

Figure 5:
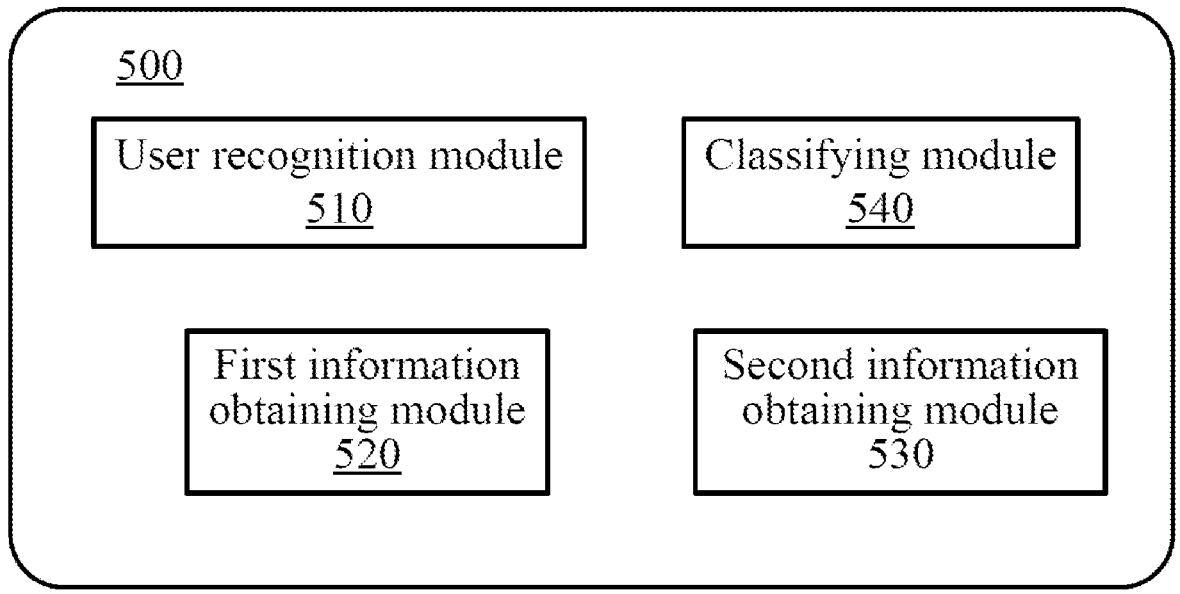
FIG. 5 illustrates a block diagram of a system for management of article storage according to some exemplary arrangements of the present disclosure.

FIG. 5 illustrates a block diagram of a system for management of article storage according to some exemplary arrangements of the present disclosure.

As shown in FIG. 5, the system 500 for management of article storage includes a user recognition module 510, a first information obtaining module 520, a second information obtaining module 530, and a classifying module 540.

The user recognition module 510 is configured to recognize user identity information and associate the user identity information with a user identifier. The user recognition module 510 may be a user recognition sensor, specifically, which may be a face recognition image sensor. For example, it may be implemented by face recognition of a video monitoring system. However, the present disclosure is not limited thereto, and the user recognition sensor may be other biometric sensors such as fingerprint identification sensor.

The first information obtaining module 520 is configured to obtain first information on taking an article by a user. The first information includes an article identifier of the article, the user identifier of the user, an identifier of a location where the article is taken, and information on an action of taking the article by the user. The first information obtaining module 520 may be an information obtaining device such as image capturing device. For example, it may be a video monitoring device with a camera.

The second information obtaining module 530 is configured to obtain second information on placing the article by the user. The second information includes the article identifier of the article, the user identifier of the user, an identifier of a location where the article is placed, and information on an action of placing the article by the user. The second information obtaining module 530 may be an information obtaining device such as image capturing device. For example, the second information obtaining module 530 may be a video monitoring device with a camera.

The classifying module 540 is configured to classify the action of placing the article by the user based on the first information and the second information. Herein, the classifying module 540 may be a processor, and the processor may be for example a central processing unit (CPU), field-programmable gate array (FPGA) and the like.

Figure 6:
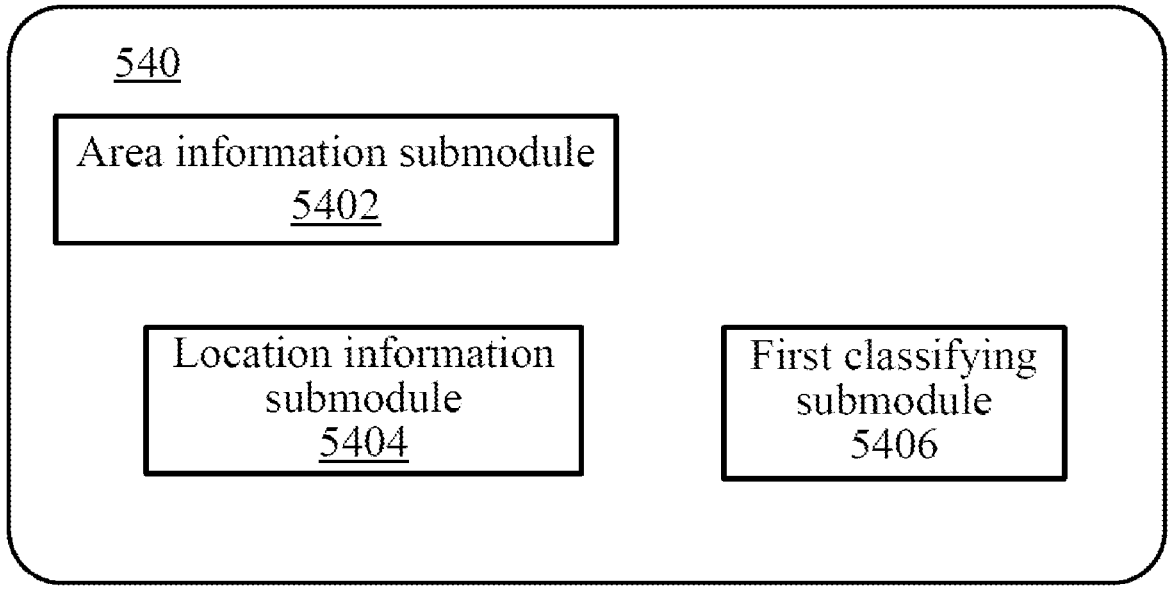
FIG. 6 illustrates a block diagram showing the constitution of a classifying module according to some exemplary arrangements of the present disclosure.

FIG. 6 illustrates a block diagram showing the constitution of the classifying module 540 according to some exemplary arrangements of the present disclosure.

As shown in FIG. 6, the classifying module 540 includes an area information submodule 5402, a location information submodule 5404, and a first classifying submodule 5406.

The area information submodule 5402 is configured to generate information on a correct storage area of the article based on the article identifier of the article and the identifier of the location where the article is taken of the first information. The correct storage area includes the location where the article is taken.

The location information submodule 5404 is configured to determine the location where the article is placed based on the identifier of the location where the article is placed of the second information.

The first classifying submodule 5406 is configured to classify the action of placing the article by the user as a first type of action when the location where the article is placed is not in the correct storage area.

Herein, the area information submodule 5402, location information submodule 5404, and first classifying submodule 5406 may be implemented by one or more processors.

The above modules may implement the foregoing methods and operations, and thus their detailed descriptions are omitted herein.

Figure 7:
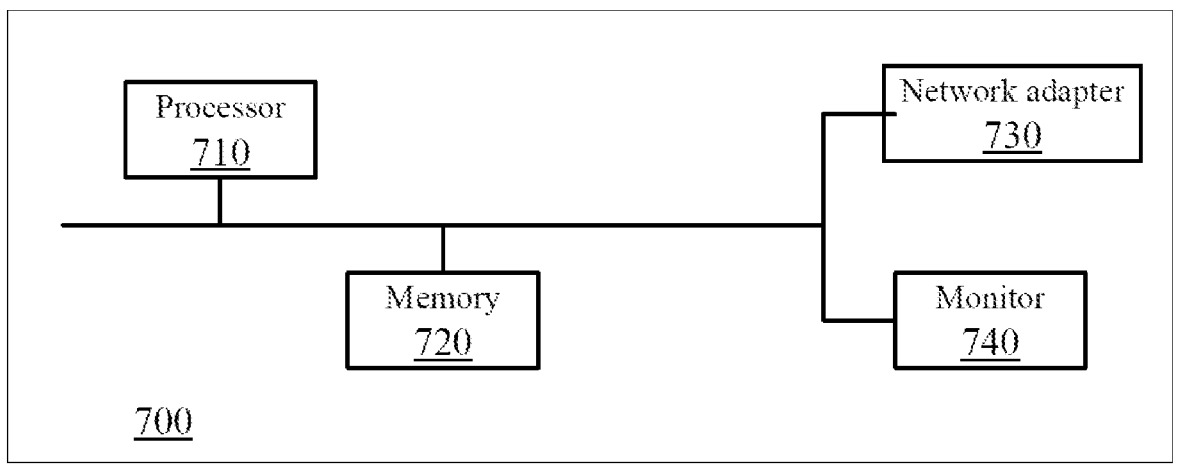
FIG. 7 illustrates a server device according to some arrangements of the present disclosure.

FIG. 7 illustrates a server device according to some arrangements of the present disclosure.

As shown in FIG. 7, the server device 700 may include a processor 710, a memory 720, a network adapter 730, and a monitor 740.

The memory 720 may store instructions used by the processor 710 to control operation processing. The memory 720 may include a volatile or non-volatile memory, such as a static random access memory (SRAM), an electrically erasable programmable read-only memory (EEPROM), an erasable programmable read-only memory (EPROM), a programmable read-only memory (PROM), a read-only memory (ROM), and so on, and the present disclosure is not limited thereto.

The processor 710 may call the instructions stored in the memory 720 to control relevant operations. According to some arrangements, the memory 720 stores instructions used by the processor 710 to control following operations: recognizing user identity information, and associating the user identity information with a user identifier; obtaining first information on taking an article by a user. The first information includes an article identifier of the article, the user identifier of the user, an identifier of a location where the article is taken, and information on an action of taking the article by the user; obtaining second information on placing the article by the user. The second information includes the article identifier of the article, the user identifier of the user, an identifier of a location where the article is placed, and information on an action of placing the article by the user; and classifying the action of placing the article by the user based on the first information and the second information. The memory 720 may store instructions used by the processor 710 to control other operations according to the arrangements of the present disclosure, and relevant descriptions thereof are omitted herein.

Through the above detailed description, those skilled in the art readily understand that the system and method according the arrangements of the present disclosure have one or more of the following improvements.

When performing article storage and management, an action of placing an article by a user is classified based on the obtained information. In this way, corresponding incentive and management may be carried out.

Corresponding incentive is given for the user's action to cultivate a good habit of article storage for the user.

By means of record management of the matching relationship between the consumer and the commodity, it is avoidable that the consumer evades shopping monitoring or places the commodity in a monitoring blind angle.

Through database records and incentives based on mark operations, cultivation of habits may be ensured more continuous.

With description of the above arrangements, it will be readily understood by those skilled in the art that the arrangements of the present disclosure may be implemented by hardware or by means of software in combination with the necessary hardware. Thus, the technical solutions according to the arrangements of the present disclosure may be embodied in the form of a software product which may be stored on a nonvolatile storage medium (which may be CD-ROM, flash memory, mobile hard disk and the like), including a number of instructions for enabling a computing device (which may be a personal computer, a server, a mobile terminal, or a smart device and the like) to perform the method according to the arrangements of the present disclosure.

It will be understood by those skilled in the art that the drawings are merely schematic diagrams of exemplary arrangements and that the modules or processes in the drawings are not indispensably necessary to implement the present disclosure and are therefore not intended to limit the scope of protection of the present disclosure.

It will be understood by those skilled in the art that the above-described modules may be distributed in the apparatus as described in the arrangements, or may be modified in one or more devices different from the present arrangement. The modules of the above-described arrangements may be combined into one module or may be further divided into a plurality of submodules.

Exemplary arrangements of the present disclosure are particularly shown and described as above. It is to be understood that the present disclosure is not limited to the disclosed arrangements, but rather that the present disclosure is intended to cover various modifications and equivalent arrangements included within the spirit and scope of the appended claims.

What is claimed is:

1. A method for management of article storage, comprising:
   recognizing user identity information and associating the user identity information with a user identifier;
   obtaining first information on taking an article by a user, the first information comprising an article identifier of the article, the user identifier of the user, an identifier of a location where the article is taken, and information on an action of taking the article by the user;
   obtaining second information on placing the article by the user, the second information comprising the article identifier of the article, the user identifier of the user, an identifier of a location where the article is placed, and information on an action of placing the article by the user; and classifying the action of placing the article by the user based on the first information and the second information, wherein classifying the action of placing the article by the user based on the first information and the second information comprises:

generating information on a correct storage area of the article based on the article identifier of the article and the identifier of the location where the article is taken from the first information, the correct storage area comprising the location where the article is taken;

determining the location where the article is placed based on the identifier of the location where the article is placed from the second information; and classifying the action of placing the article by the user as a first type of action when the location where the article is placed is not in the correct storage area; and giving a negative incentive to the first type of action of the user.

2. The method according to claim 1, wherein the article is a commodity, and the user is a consumer.

3. The method according to claim 2, wherein
the correct storage area of the article comprises at least one of: a shopping cart of the consumer, a shelf from which the commodity is taken, a shelf to which the commodity is assigned, or a temporary storage area; and
the shopping cart comprises a shopping cart identifier, and the shelf comprises a shelf identifier.

4. The method according to claim 3, further comprising:
establishing a matching relationship between the commodity and the consumer after obtaining the first information; and
after obtaining the second information, canceling the matching relationship between the commodity and the consumer when a placement area is not the shopping cart of the consumer.

5. The method according to claim 3, further comprising: establishing a correlation between the consumer and the shopping cart.

6. The method according to claim 2, wherein
after obtaining settlement information of the consumer, the action of the consumer is determined as the first type of action when quantity of commodities matching the consumer is not equal to that of commodities settled by the consumer.

7. The method according to claim 1, wherein giving a negative incentive to the first type of action of the user comprises: deducting marks of the user or reducing shopping discounts in a database.

8. The method according to claim 1, wherein
obtaining first information on taking an article by the user comprises: obtaining first image information on taking the article by the user by an image capturing apparatus, and recognizing, in the first image information, the article identifier of the article, the identifier of the location where the article is taken, feature information of the user, and the information on the action of taking the article by the user; and
wherein obtaining second information on placing the article by the user comprises:
obtaining second image information on placing the article by the user by the image capturing apparatus, and recognizing, in the second image information, the article identifier of the article, the identifier of the location where the article is placed, the feature information of the user, and the information on the action of placing the article by the user; and
determining the user identifier of the user based on the feature information of the user.

9. The method according to claim 1, wherein the method is implemented by a system comprising at least one hardware processor through execution of a computer program stored in a memory.

10. A non-transitory computer-readable medium having program instructions stored thereon that, when executed by at least one hardware processor, direct the at least one hardware processor to:
recognize user identity information and associate the user identity information with a user identifier;
obtain first information on taking an article by a user, the first information comprising an article identifier of the article, the user identifier of the user, an identifier of a location where the article is taken, and information on an action of taking the article by the user;
obtain second information on placing the article by the user, the second information comprising the article identifier of the article, the user identifier of the user, an identifier of a location where the article is placed, and information on an action of placing the article by the user; and
classify the action of placing the article by the user based on the first information and the second information by:
generating information on a correct storage area of the article based on the article identifier of the article and the identifier of the location where the article is taken from the first information, the correct storage area comprising the location where the article is taken;
determining the location where the article is placed based on the identifier of the location where the article is placed from the second information; and
classifying the action of placing the article by the user as a first type of action when the location where the article is placed is not in the correct storage area; and
giving a negative incentive to the first type of action of the user.

11. A system for management of article storage, comprising:
a user recognition sensor configured to recognize user identity information and associate the user identity information with a user identifier;
a first information obtaining device configured to obtain first information on taking an article by a user, the first information comprising an article identifier of the article, the user identifier of the user, an identifier of a location where the article is taken, and information on an action of taking the article by the user;
a second information obtaining device configured to obtain second information on placing the article by the user, the second information comprising the article identifier of the article, the user identifier of the user, an identifier of a location where the article is placed, and information on an action of placing the article by the user; and
at least one hardware processor configured to:
classify the action of placing the article by the user based on the first information and the second information;
generate information on a correct storage area of the article based on the article identifier of the article and the identifier of the location where the article is taken from the first information, the correct storage area comprising the location where the article is taken;

determine the location where the article is placed based on the identifier of the location where the article is placed from the second information;

classify the action of placing the article by the user as a first type of action when the location where the article is placed is not in the correct storage area; and give a negative incentive to the first type of action of the user.

* * * * *